United States Patent
Sieradzki

(10) Patent No.: US 12,208,559 B2
(45) Date of Patent: Jan. 28, 2025

(54) CONTAINER FORMING SYSTEM WITH HYDROPHOBIC PROPERTIES

(71) Applicant: Discma AG, Hünenberg (CH)

(72) Inventor: Richard Sieradzki, Novi, MI (US)

(73) Assignee: DISCMA AG, Hünenberg (CH)

( * ) Notice: Subject to any disclaimer, the term of this patent is extended or adjusted under 35 U.S.C. 154(b) by 114 days.

(21) Appl. No.: 17/999,415

(22) PCT Filed: Jun. 18, 2020

(86) PCT No.: PCT/IB2020/055751
§ 371 (c)(1),
(2) Date: Nov. 21, 2022

(87) PCT Pub. No.: WO2021/255502
PCT Pub. Date: Dec. 23, 2021

(65) Prior Publication Data
US 2023/0191682 A1  Jun. 22, 2023

(51) Int. Cl.
*B29C 49/46* (2006.01)
*B29C 33/56* (2006.01)
(Continued)

(52) U.S. Cl.
CPC .......... *B29C 49/1212* (2022.05); *B29C 33/56* (2013.01); *B29C 49/06* (2013.01);
(Continued)

(58) Field of Classification Search
CPC ...... B29C 49/42403; B29C 2049/5868; B29C 2049/4664; B29C 2049/465; B29C 49/46
See application file for complete search history.

(56) References Cited

U.S. PATENT DOCUMENTS 8,435,026 B2  5/2013 Andison et al.
9,302,421 B2 *  4/2016 Wilson .................... B29C 49/42
(Continued)

FOREIGN PATENT DOCUMENTS

CA  2286767 A1 * 10/1998
DE  102014019400 A1 *  6/2016 ............. B29C 49/46
DE  102015208956 A1 * 11/2016

OTHER PUBLICATIONS

Mechanical translation of Litzenberg et al. (Year: 2016).*
Mechanical translation of Lappe et al. (Year: 2016).*

*Primary Examiner* — Robert B Davis
(74) *Attorney, Agent, or Firm* — Michael E. Dockins; Shumaker, Loop & Kendrick, LLP

(57) ABSTRACT

Ways for simultaneously forming and filling a container with a liquid product are provided that include a mold cavity, a dispensing means, a blow nozzle, a conduit, and a hydrophobic surface. The mold cavity defines an internal surface and accepts a preform. The dispensing means receives the liquid product and dispenses a charge of the liquid product. The blow nozzle transfers the charge of the liquid product dispensed from the dispensing means into the preform to urge the preform to expand toward the internal surface of the mold cavity and form a resultant container. The liquid product remains within the container as an end product. The conduit fluidly couples the dispensing means to the blow nozzle. The hydrophobic surface contacts the liquid product when the system simultaneously forms and fills the container, where the hydrophobic surface forms part of the dispensing means, the blow nozzle, and/or the conduit.

20 Claims, 8 Drawing Sheets

(51) Int. Cl.
*B29C 49/06* (2006.01)
*B29C 49/12* (2006.01)
*B29C 49/42* (2006.01)
*B29C 49/58* (2006.01)
*B29K 667/00* (2006.01)

(52) U.S. Cl.
CPC .. *B29C 49/42403* (2022.05); *B29C 49/42828* (2022.05); *B29C 2049/4664* (2013.01); *B29C 2049/5868* (2013.01); *B29K 2667/003* (2013.01)

(56) References Cited

U.S. PATENT DOCUMENTS

| | | | |
|---|---|---|---|
| 2009/0218733 A1* | 9/2009 | Andison | B29C 49/46 264/525 |
| 2013/0147097 A1* | 6/2013 | Lane | B65D 1/0207 264/524 |
| 2016/0052177 A1* | 2/2016 | Chauvin | B29C 49/48 425/524 |
| 2016/0271858 A1 | 9/2016 | Diesnis | |
| 2019/0283306 A1 | 9/2019 | Diesnis et al. | |
| 2022/0203596 A1* | 6/2022 | Yoshino | B29C 49/58 |

* cited by examiner

CONTAINER FORMING SYSTEM WITH HYDROPHOBIC PROPERTIES

FIELD

The present technology relates to improved transfer of a liquid for simultaneously forming and filling a container, including a container forming and filling system having hydrophobic liquid transfer surfaces.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes, polycarbonate, and polypropylene, among others. Plastic containers can be made using various blow molding processes including injection blow molding and extrusion blow molding.

Injection blow molding can be used to form certain plastic containers in one or more stages and can involve use of a stretch rod. In a two-stage injection stretch blow molding process, the plastic is first molded into a preform using an injection molding process. The preform includes the neck and finish of the container to be formed, which can include threading thereon, and a closed distal end. The preform can then be heated above the plastic glass transition temperature, longitudinally stretched with a stretch rod, and blown using high-pressure gas (e.g., air) into a container conforming to a mold. As the preform is inflated, it elongates and stretches, taking on the shape of the mold cavity. The plastic solidifies upon contacting the cooler surface of the mold and the finished hollow container is subsequently ejected from the mold. The injection stretch blow molding process can be used to form plastic containers for packaging consumer beverages, as well as other liquids and materials. However, the process has some inherent limitations, which include undesirable gate wells or discontinuities on the bottom portions of containers as well as limitations on the possible spectrum of designs that can be realized using the stretch blow molding process, such as containers incorporating a handle or void space therein.

Extrusion blow molding can be used to form certain plastic containers where a continuously extruded hot plastic tube or parison is captured within a mold and inflated against the inner surfaces of the mold to form a container blank. The mold can be designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion. While extrusion blow molding processes have addressed a need for an improved plastic container that obviates some of the disadvantages inherent to containers fabricated using the stretch blow molding process, the extrusion blow molding processing requires a number of steps to form the container then later fill and cap the container. As a result, significant costs can be incurred while separately performing the container forming and filling processes, including transport and time commitments.

Blow molding containers and subsequent filling of containers have consequently developed as two independent processes, in many cases operated at different facilities. In order to make container filling more cost effective, some filling facilities have installed blow molding equipment on site, in many cases integrating blow molders directly into filling lines. Equipment manufacturers have recognized this advantage and are selling "integrated" systems that are designed to insure that the blow molder and the filler are fully synchronized. Despite the efforts in bringing the two processes together, blow molding and filling continue to be two independent, distinct processes. As a result, significant costs may be incurred in separately performing these two processes.

In response to the separate blow molding and filling processes, certain liquid or hydraulic blow molding systems have arisen that form and fill a container in a single operation. The liquid product used to form and fill the preform into the resultant container can thereafter remain the finished container. Combination of the forming and filling steps can therefore optimize packaging of a liquid product by eliminating the transport of empty bottles and time demands related to subsequent filling operations.

Certain obstacles exist in forming and filling containers with certain products, however. In particular, certain products can exhibit low surface tension, high viscosity, and/or have an affinity or even reactivity with certain surfaces. Handling and transferring such products to form and fill containers can result in residual product sticking, adhering, or reacting to parts of surfaces to which the product contacts. This can present a problem when attempting to transfer a defined charge or quantity of product through a forming and filling system, as any residual product left in material handling components, such as reservoirs, conduits, pumps, dispensing units, and the like creates imprecision in transfer of a defined charge of product. For example, product residue left behind can decrease the amount of a charge of product passing through the system, whereas preexisting residue within the system may add to the volume of the charge of product passing through the system. In either case, a reduction in certainty in handling defined amounts of product can be deleterious to simultaneously forming and filling a container with the the charge of product, where a preform is designed to expand by a defined amount within a defined mold volume. There is accordingly a need to optimize transfer of certain products by minimizing product residue when simultaneously forming and filling containers.

SUMMARY

The present technology includes systems, processes, and articles of manufacture that relate to the use of one or more hydrophobic liquid transfer surfaces to maximize accuracy in transferring a liquid product to simultaneously form and fill a container, where the liquid product remains in the container as an end product. Such hydrophobic liquid transfer surfaces can further improve cleaning by facilitating removal of residual liquid product or cleaning solution.

Ways are provided for simultaneously forming and filling a container with a liquid product that include a mold cavity, a dispensing means, a blow nozzle, a conduit fluidly coupling the dispensing means to the blow nozzle, and a hydrophobic surface. The mold cavity defines an internal surface and is configured to accept a preform while the dispensing means is configured to receive the liquid product and dispense a charge of the liquid product. The blow nozzle is configured to transfer the charge of the liquid product dispensed from the dispensing means into the preform to urge the preform to expand toward the internal surface of the mold cavity and form a resultant container, where the liquid product remains within the container as an end product. The hydrophobic surface contacts the liquid product when the system simultaneously forms and fills the container, where the hydrophobic surface forms part of the dispensing means, the blow nozzle, and/or the conduit therebetween. In certain embodiments, a stretch rod is provided that is operable to mechanically stretch the preform within the mold cavity prior to the charge of the liquid product being transferred into the preform by the blow nozzle. Where the stretch rod is present, the hydrophobic surface can form part of the dispensing means, the blow nozzle, the conduit, and/or the stretch rod. Various types of hydrophobic surfaces can be employed, including where the hydrophobic surface includes a hydrophobic coating, such as a polymeric coating (e.g., polyethylene, polystyrene, polyvinylchloride, polytetrafluoroethylene, polydimethylsiloxane, etc.), a hydrophobic microstructure, a hydrophobic coating having a hydrophobic microstructure, and a surface treatment (e.g. plasma treatment, anodizing treatment, etc.).

Ways of cleaning various systems used to simultaneously form and fill containers with a liquid product are provided. In particular, a gas can be blown across the hydrophobic surface that contacts the liquid product when the system simultaneously forms and fills the container to remove residual liquid from the hydrophobic surface. The residual liquid can include residual liquid product from a prior forming and filing operation and/or a cleaning solution used to flush and clean the system. The gas can also be a dry gas (e.g., dry carbon dioxide or nitrogen) to aid in evaporation of residual liquid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
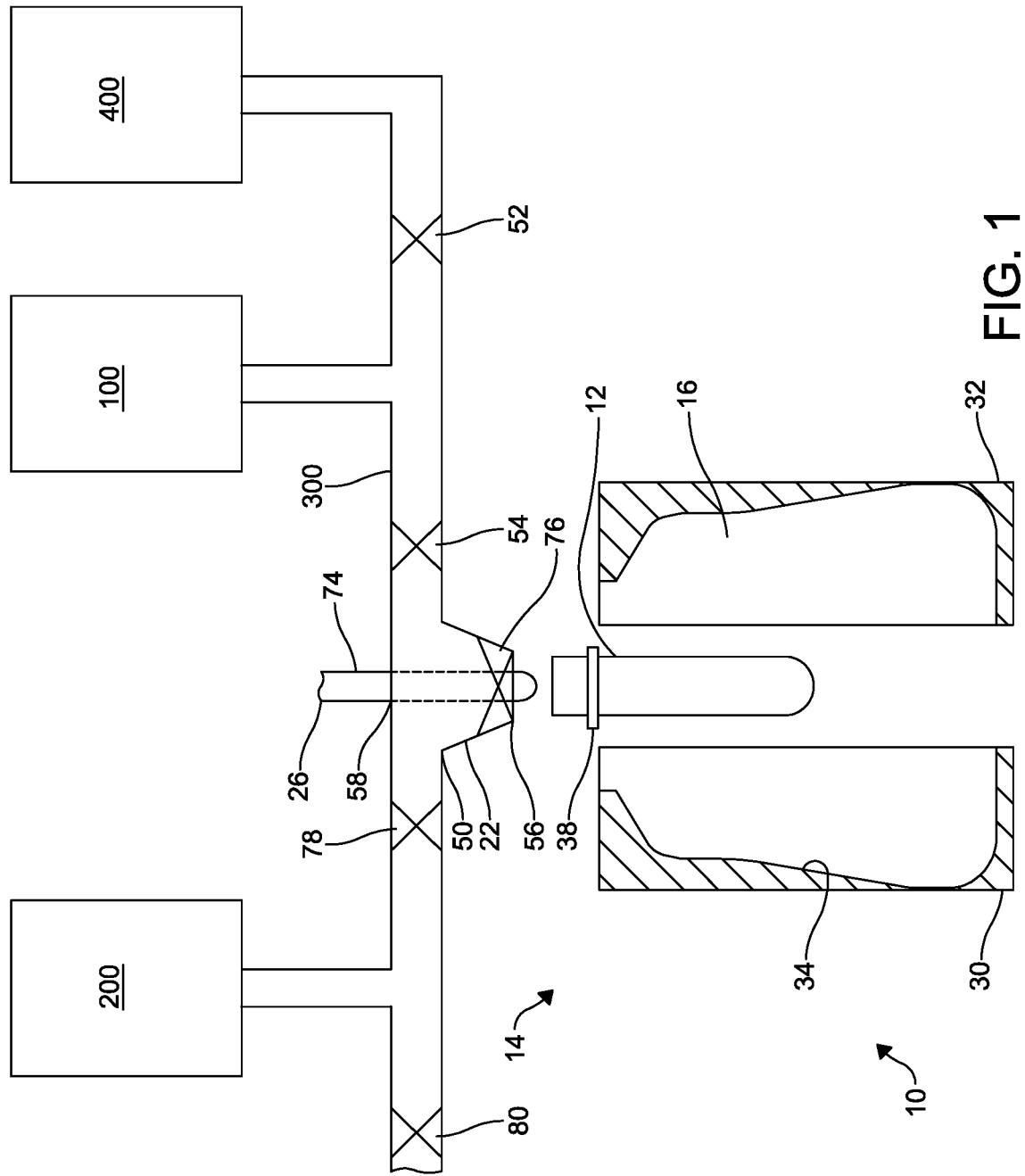
FIG. 1 is a schematic depiction of a system for simultaneously forming and filling a container in accordance with the present technology, where a heated preform is passed into a mold station, a dispensing unit is fluidly coupled to a blow nozzle, and a stretch rod is configured to pass through the blow nozzle into the preform.

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology allows for simultaneously forming and filling a container with a liquid product in contact with a hydrophobic surface to maximize transfer of a defined charge of the liquid product and minimize residual liquid product in providing a product-filled container. Various systems, processes, and articles of manufacture described herein allow for simultaneously forming and filling a container with a liquid product by making use of a mold cavity, a dispensing means, a blow nozzle, a conduit, and one or more hydrophobic surfaces. The mold cavity defines an internal surface and is configured to accept a preform. The dispensing means is configured to receive the liquid product and dispense a charge of the liquid product. The blow nozzle is configured to transfer the charge of the liquid product dispensed from the dispensing means into the preform to urge the preform to expand toward the internal surface of the mold cavity and form a resultant container, where the liquid product remains within the container as an end product. The conduit fluidly couples the dispensing means to the blow nozzle. The hydrophobic surface contacts the liquid product when the system simultaneously forms and fills the container, where the hydrophobic surface forms part of the dispensing means, the blow nozzle, and/or the conduit. In this way, the present technology is capable of increasing certainty in handling defined amounts of product used to simultaneously form and fill a container. Transfer of certain products and the accuracy of product charge volumes can therefore be optimized by minimizing product residue.

Certain embodiments of the present technology include a stretch rod configured to mechanically stretch the preform within the mold cavity prior to the charge of the liquid product being transferred into the preform by the blow nozzle. In such embodiments, the hydrophobic surface can forms part of the dispensing means, the blow nozzle, the conduit, and/or the stretch rod. For example, where the stretch rod remains at least partially within a stretched preform during the filling and expansion of the preform within the mold cavity, the stretch rod can come in contact with the liquid product. Subsequent withdrawal of the stretch rod from the partially filled and expanding preform or from the filled and expanded container can remove a portion of the liquid product that sticks to or adheres to the stretch rod. Removal of such residue can reduce the accuracy in the amount of liquid product within the resultant container. Likewise, residual liquid product stuck or adhered to the stretch rod can be introduced into a subsequently formed and filled container. Providing the hydrophobic surface on at least a portion of the stretch rod that contacts the liquid product during the forming and filling operations can thereby minimize residue from products having low surface tension, high viscosity, and/or have an affinity or even reactivity with certain surfaces. The stretch rod can also be vented and an internal conduit of the stretch rod used for venting can include the hydrophobic surface to minimize residue of any liquid product that comes in contact therewith.

The dispensing means used in the present technology can take several forms. In certain embodiments, the dispensing means includes a pressure source. The pressure source can have an inlet, a chamber, an outlet, and a mechanically driven piston-like device moveable within the chamber in a first direction to draw liquid product into the chamber through the inlet and moveable in a second direction to urge the liquid product out of the chamber through the outlet as the charge of the liquid product. The piston-like device can be one of a piston, a pump, and an accumulator. Particular examples include pressure source 20 described by U.S. Pat. No. 8,435,026 to Andison et al. and pressure source 20 described by U.S. Pat. No. 8,858,214 to Andison et al., each of which is incorporated herein by reference. In certain embodiments, the dispensing means can include a pressure source 20 and servo system 60 as described by Int'l Pub. No. WO/2019/002944 by DISCMA AG filed on Jun. 28, 2018, which is incorporated herein by reference. In certain embodiments, the dispensing means includes a pressure source and a hydraulic intensifier. Particular examples include the pressure source 20 and hydraulic intensifier 60 as described by U.S. Provisional Patent Appl. No. 62/867,546 to Sieradzki filed Jun. 27, 2019, which is incorporated herein by reference. In certain embodiments, the dispensing means includes a two-stage injection unit. The two-stage injection unit can be configured to receive the liquid product and dispense the liquid product, where the two-stage injection unit includes a first stage comprising an extruder and a second stage comprising an accumulator. The extruder can be configured to impart mechanical energy to the product to reduce a viscosity of the product and transfer the reduced-viscosity product to the accumulator. The accumulator an be configured to receive the reduced-viscosity product from the extruder and dispense a charge of the reduced-viscosity product. Particular examples include the two-stage electric injection unit described by U.S. Pat. No. 5,863,567 to M. Barr Klaus, which is incorporated herein by reference. Two-stage injection units suitable for use in the present technology further include those available as Mold-Masters E-Multi from Milacron LLC (Cincinnati, Ohio).

The hydrophobic surface used in the present technology can take several forms. In certain embodiments, the hydrophobic surface includes a hydrophobic coating. For example, one or more portions of the dispensing means (e.g., plunger, cavity, reservoir, hydraulic intensifier, extruder, accumulator, etc.), the blow nozzle, the conduit fluidly coupling the dispensing means and the blow nozzle, and/or the stretch rod can be coated with a hydrophobic coating to increase an interfacial tension of a liquid product in contact therewith, to reduce the stickiness or affinity of the liquid product with the surface, and/or to reduce a reactivity of the liquid product with the surface. Certain examples include where the hydrophobic coating includes a polymeric coating, with particular examples including polymeric coatings of polyethylene, polystyrene, polyvinylchloride, polytetrafluoroethylene, and/or polydimethylsiloxane. In certain embodiments, the hydrophobic surface can include a hydrophobic microstructure. Examples of hydrophobic microstructures include those associated with what is referred to as the "lotus effect," which can increase surface tension of the liquid product relative to the hydrophobic microstructure. In certain embodiments, the hydrophobic surface can include a hydrophobic coating having a hydrophobic microstructure. Examples include certain hydrophobic microstructured films applied to one or more surfaces. In certain embodiments, the hydrophobic surface can be formed by a surface treatment. Examples of such surface treatments include plasma treatments and anodizing treatments. Ways to provide the hydrophobic surface can further include the examples or providing hydrophobic properties as described by U.S. Pat. No. 10,137,606 to Chauvin et al., which is incorporated herein by reference.

The present technology also includes various systems and system components having the features provided herein. Methods of using such systems and components for simultaneously forming and filling a container with a liquid product are also contemplated by the present technology. Accurately filled containers formed using the present technology (e.g., product-by-process) are also provided. Methods of cleaning such systems are provided that include blowing a gas across the hydrophobic surface that contacts the liquid product when the system simultaneously forms and fills the container to remove residual liquid from the hydrophobic surface. Some embodiments include where the residual liquid comprises the liquid product. Other embodiments include where the residual liquid comprises a cleaning solution.

With reference now to the several figures provided herewith, an embodiment of a system and operation thereof according to the present technology is shown and generally referred to as reference numeral 10. FIGS. 1-7 show an embodiment of a sequence for simultaneously forming and filling a container C using the system 10 in accordance with the present technology. As will be appreciated from the following description, the system 10 and associated method utilize a liquid product to impart the pressure required to expand or further expand a preform 12 to take on the shape of a mold cavity 16, thus simultaneously forming and filling a resultant container C with the liquid product.

The system 10 includes a dispensing means that is represented by reference numeral 100, or where a multi-part dispensing means is contemplated, the dispensing means can be represented by reference numerals 100 and 200. For example, where the dispensing means includes a pressure source such as described by pressure source 20 in U.S. Pat. No. 8,435,026 to Andison et al. or U.S. Pat. No. 8,858,214 to Andison et al., pressure source 20 can be located at reference numeral 100 in FIGS. 1-7 of the present disclosure. Where the dispensing means includes a pressure source and servo system, such as the pressure source 20 and servo system 60 as described by Int'l Pub. No. WO/2019/002944 by DISCMA AG filed on Jun. 28, 2018, the pressure source and servo system can be located at reference numeral 100 in FIGS. 1-7 of the present disclosure. Where the dispensing means includes a multi-part pressure source, such as described by pressure source 20 and hydraulic intensifier 60 in U.S. Provisional Patent Appl. No. 62/867,546 to Sieradzki filed Jun. 27, 2019, the pressure source 20 can be located at reference numeral 100 and the hydraulic intensifier can be located at reference numeral 200 in FIGS. 1-7 of the present disclosure. Where the dispensing means includes a two-stage injection unit, such as the two-stage injection unit described in U.S. Pat. No. 5,863,567 to M. Barr Klaus or the two-stage injection units known as Mold-Masters E-Multi available from Milacron LLC (Cincinnati, Ohio), the two-stage injection unit can be located at reference numeral 100 in FIGS. 1-7 of the present disclosure.

The dispensing means (whether one-part 100 or multi-part 100, 200) is configured to receive the liquid product and dispense a charge of the liquid product. The system 10 can include a reservoir 400 that provides a source of the liquid product used to form and fill the container. Valve 52 can be opened to allow the dispensing means 100, 200 to receive the liquid product from the reservoir 400. Multiple reservoirs 400 can be provided for use with multiple liquid products and can include conduits and valving to selectively couple each of the multiple reservoirs (not shown) to the remainder of the system 10. The reservoir 400 can be coupled to the dispensing means (e.g., one-part 100 or multi-part 100, 200) in various ways and can be selectively coupled to other parts of the system 10 via one or more valves; e.g., see valves 52, 54, 76, 68, 80.

A conduit 300 fluidly couples the dispensing means 100, 200 to a blow nozzle 22. As such, the charge of liquid product is dispensed through the conduit 300 to the blow nozzle 22 where the charge of liquid product is transferred by the blow nozzle 22 into the perform 12 within the mold 14. The conduit 300 can be configured in various ways and include various valving (e.g., see valves 52, 54, 76, 68, 80). Where the system 10 employs a one-part dispensing means 100, the dispensing means 100 can direct the charge of liquid product therefrom, through the conduit 100, and through the blow nozzle by opening valves 54, 76, for example. Where the system 10 employs two-part dispensing means 100, 200, the first part of the dispensing means can include a pressure source at 100 that can transfer the charge of liquid product to the second part of the dispensing means, which can include a hydraulic intensifier at 200, where valves 54, 78 are open. The hydraulic intensifier at 200 can then provide the charge of liquid product to the blow nozzle 22 when valves 78, 76 are open.

Figure 2:
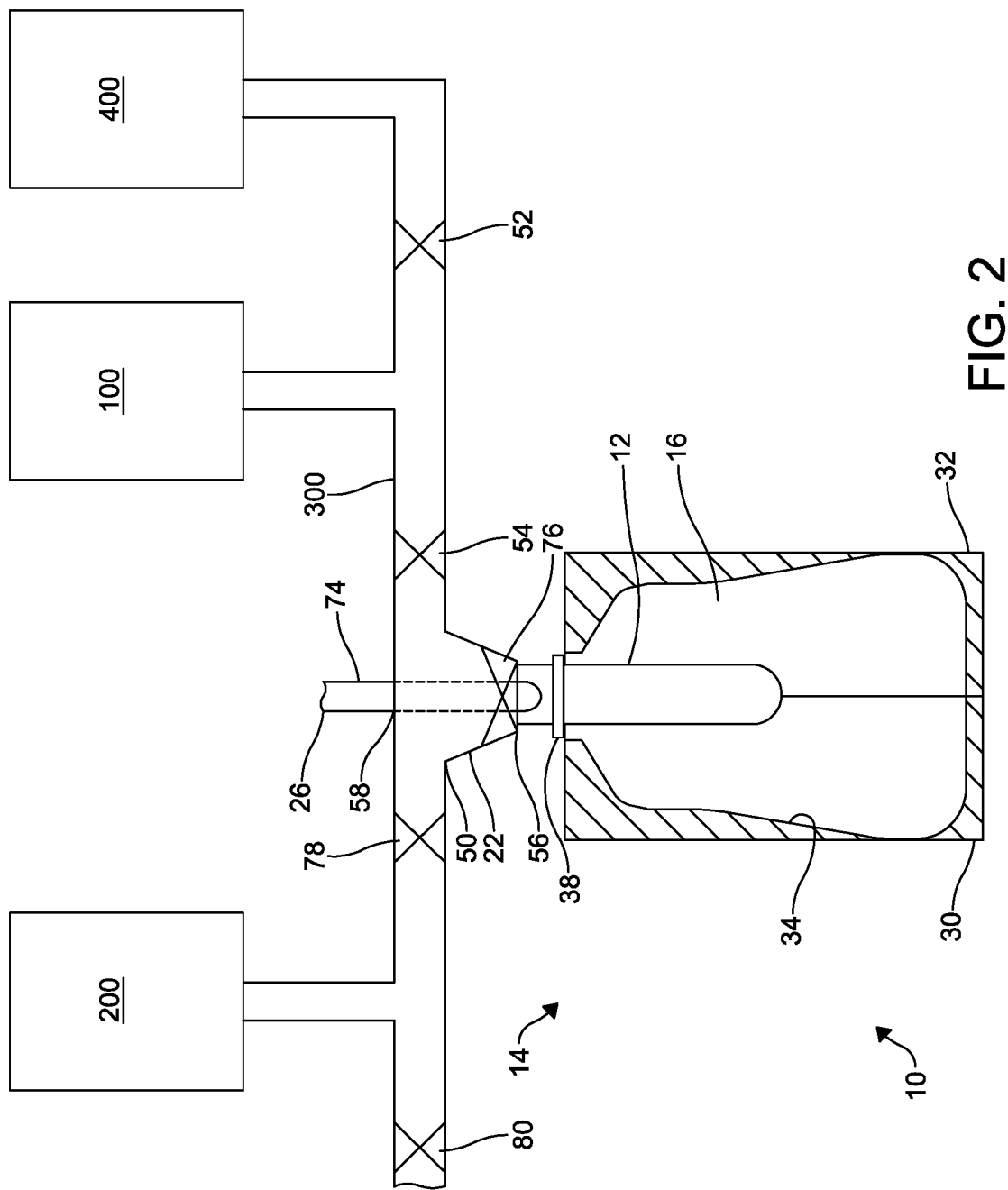
FIG. 2 is a schematic depiction of the system illustrated in FIG. 1, where the mold halves close around the preform and a liquid product can be loaded into the dispensing unit.

Operation of the system 10 in simultaneously forming and filling a container can include the following aspects. With reference to FIGS. 1-2, the system 10 can generally comprise the mold 14 having a mold cavity 16, the dispensing means 100, 200, the blow nozzle 22, the conduit 300, a hydrophobic surface that contacts the liquid product when the system simultaneously forms and fills the container, and a stretch rod 26. The exemplary mold cavity 16 illustrated in the figures includes two mold halves 30, 32 that cooperate to define an interior surface 34 corresponding to a desired outer profile of the resultant container C. The mold cavity 16 can be moveable from an open position (FIG. 1) to a closed position (FIG. 2) such that a support ring 38 of the preform 12 can be captured at an upper end of the mold cavity 16. The preform 12 can be formed of a polyester material, such as polyethylene terephthalate (PET), can have a shape similar to a test-tube with a generally cylindrical cross section, and can have a length approximately fifty percent (50%) of a height of the resultant container C. The support ring 38 can be used to carry or orient the preform 12 through and at various stages of manufacture. For example, the preform 12 can be carried by the support ring 38, the support ring 38 can be used to aid in positioning the preform 12 in the mold cavity 16, and an end consumer can use the support ring 38 to carry the plastic container C once manufactured.

The blow nozzle 22 can generally define an inlet 50 for accepting the liquid product from the dispensing means 100, 200 and an outlet 56 for transferring the charge of liquid product into the preform 12. Receipt of the liquid product into the preform 12 can coincide with opening valve 54 positioned in a transfer path for the charge of liquid product into the preform 12 in passing from the dispensing means 100, 200, via conduit 300, through the blow nozzle 22, and into the preform 12. Another valve 76 can be positioned within the blow nozzle 22 to control delivery of the liquid product into the preform 12, where valve 76 is open when the blow nozzle 22 transfers a portion of the liquid product into the preform 12 to partially expand the preform 12 toward the internal surface 34 of the mold cavity 16. It is appreciated that the outlet 56 can define a shape complementary to the preform 12 near the support ring 38 such that the blow nozzle 22 can be coupled or easily engage or mate with the preform 12 during the forming/filling process. In certain embodiments, the blow nozzle 22 can define an opening 58 for slidably accepting the stretch rod 26 used to initiate mechanical stretching of the preform 12.

As shown, the conduit 300 can fluidly couple the dispensing means (whether one-part 100 or multi-part 100, 200) to the blow nozzle 22. The conduit 300 can also be fluidly coupled to other components, for example, as shown by the valves and conduit 300 portions extending to either side of dispensing means 100, 200. Such other components can include one or more product reservoirs (e.g., reservoir 400), recirculation systems or loops, clean-out or flushing systems, etc. The conduit 300 can also be configured as a manifold (e.g., FIGS. 9A-9B) that provides multiple branching points to couple the dispensing means 100, 200 to multiple blow nozzles 22 and respective multiple preforms 12 and molds 14.

The hydrophobic surface as part of the present technology can include any surface of the system 10 that contacts the liquid product when the system 10 simultaneously forms and fills the container C. Multiple surfaces of multiple parts of the system 10 can include hydrophobic surfaces, where such hydrophobic surfaces can be the same type or formation of hydrophobic surface or different types or formations of hydrophobic surfaces. In particular, the hydrophobic surface can form part of a product-contact surface in the dispensing means 100, 200, the blow nozzle 22, the conduit 300, the stretch rod 26, and/or the reservoir 400.

The liquid product can be introduced into the preform 12 and resultant plastic container C at an elevated temperature (e.g., above room temperature) from the dispensing means 100, 200. For example, the dispensing means 100, 200 can include a heater or a heat exchanger to transfer thermal energy to the liquid product. As another example, where the dispensing means 100 includes a two-stage injection unit, the first stage can include a heater configured to impart thermal energy to the liquid product to reduce the viscosity of the liquid product. The increase in temperature to the liquid product can consequently provide a warmed and reduced viscosity product to the second stage of the two-stage injection unit.

The system 10 can be further operated to simultaneously form and fill the plastic container C according to the following aspects. In certain embodiments, the preform 12 can be sterilized by steam or other means prior to being introduced into the mold cavity 16. By subjecting the preform 12 to a sterilizing technique (e.g., steam and/or heat), an aseptic preform and resulting container can be created as the dispensing means 100, 200 can be configured to dispense the charge of liquid product in a sterile or aseptic manner. The container C therefore need not be formed by a hot-filling process. Other examples of sterilizing the preform 12 include contact with one or more various sterilizing mediums, such as liquid peroxide. The preform 12 can also be passed through an oven in excess of 212° F. (100° C.) and nearly immediately subjected to forming and filling and the resultant filled container C can then be capped. In this way, the opportunity for an empty container to be exposed to the environment where it might become contaminated is minimized and the cost and complexity of aseptic filling can be reduced.

The preform 12 can be placed into the mold cavity 16; see FIGS. 1-2. For example, a machine (not illustrated) can transfer the preform 12, heated to a temperature between approximately 190° F. to 250° F. (approximately 88° C. to 121° C.), to the mold 14 where the preform 12 is enclosed within the mold cavity 16. As the preform 12 is placed into the mold cavity 16, the dispensing means 100, 200 can begin operating on the liquid product to prepare dispensing a charge of the liquid product. The mold halves 30, 32 of the mold cavity 16 can close thereby capturing the preform 12; see FIG. 2. The blow nozzle 22 can form a seal at a finish of the preform 12. The mold cavity 16 can be heated to a temperature between approximately 250° F. to 350° F. (approximately 93° C. to 177° C.) in order to impart increased crystallinity levels within the resultant container C. In other embodiments, the mold cavity 16 can be provided at ambient or cold temperatures, between approximately 32° F. to 90° F. (approximately 0° C. to 32° C.).

Figure 3:
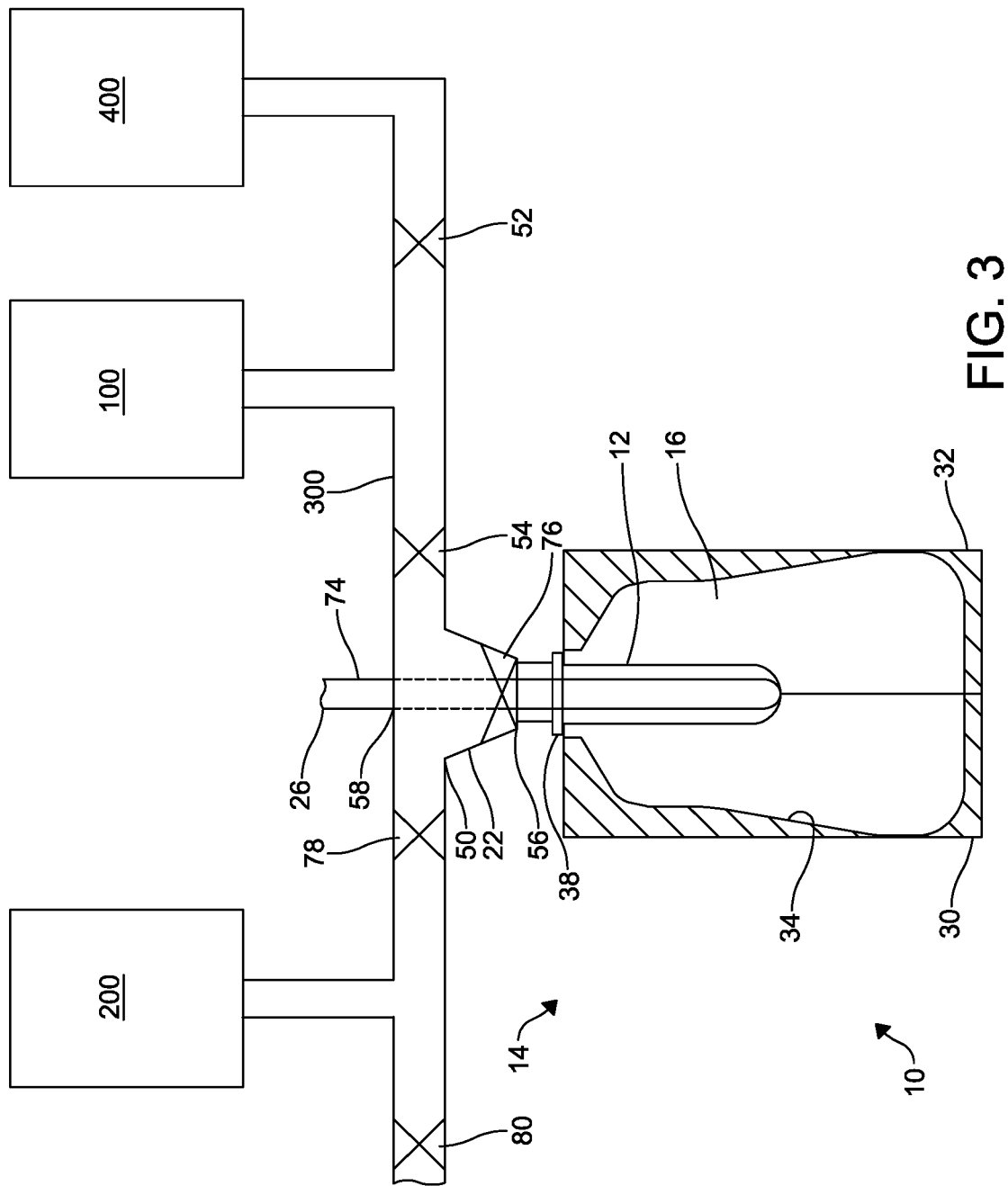
FIG. 3 is a schematic depiction of the system illustrated in FIG. 2, where a stretch rod extends into the preform to initiate mechanical stretching thereof.
Figure 4:
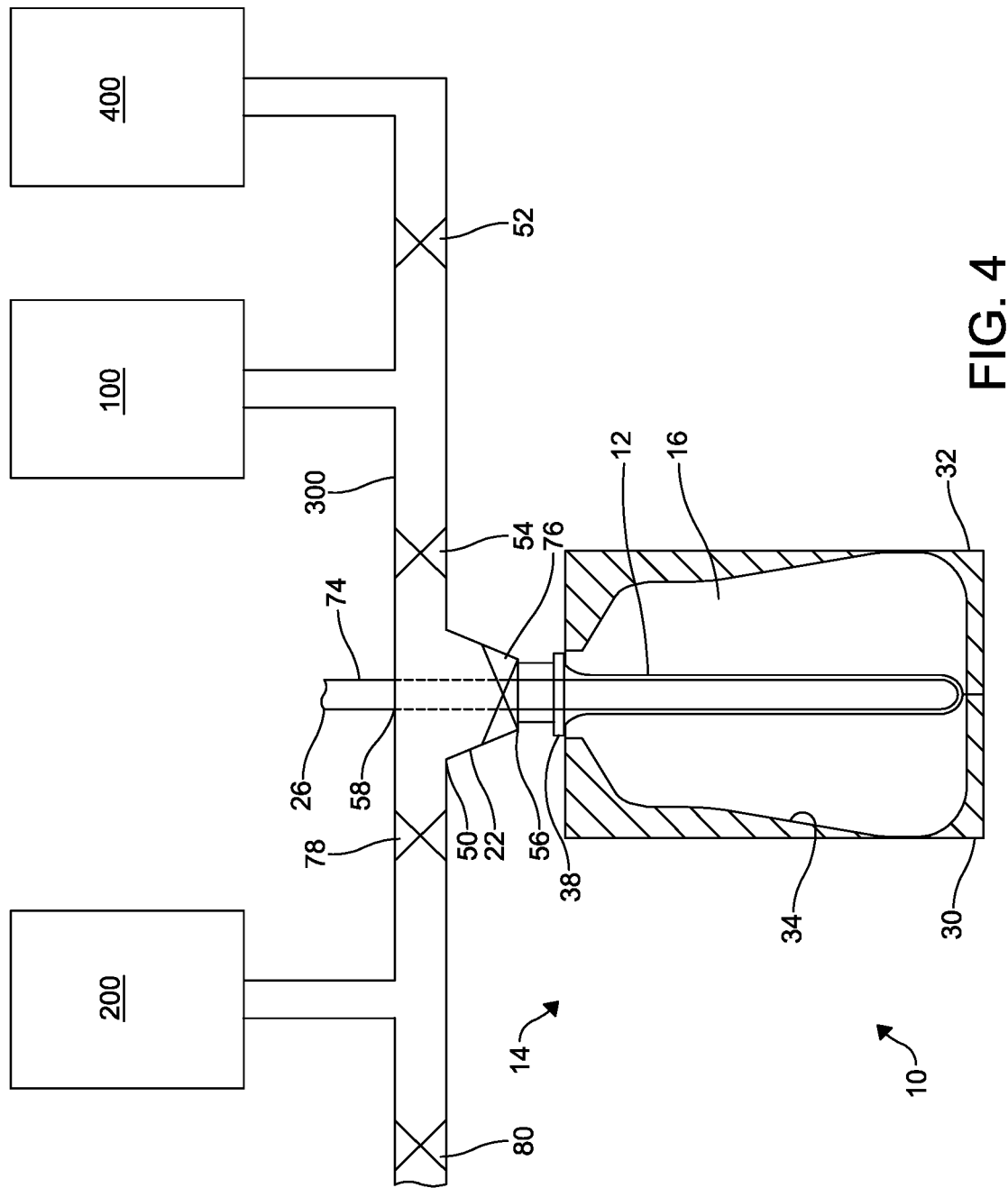
FIG. 4 is a schematic depiction of the system of FIG. 3, where the stretch rod has fully stretched the preform and where the dispensing unit has received a charge of liquid product.

Turning now to FIG. 3, the stretch rod 26 can extend into the preform 12 to initiate mechanical stretching. With reference to FIG. 4, the stretch rod 26 continues to stretch the preform 12 thereby thinning the sidewalls of the preform 12 and forming a stretched preform 12. The dispensing means 100, 200 can complete the preparation of a charge of liquid product. The charge of the liquid product can correspond to an appropriate volume suitable to form and fill the resultant container C. In certain embodiments, the conduit 300 can be configured with a manifold (e.g., FIGS. 9A-9B), which can provide multiple branching points to fluidly couple the dispensing means 100, 200 to multiple blow nozzles 22 that can be associated with multiple preforms 12 and molds 14. The charge of liquid product in such instances can be sized so that division thereof by the manifold in the conduit 300 can provide appropriately sized portions that can be directed to corresponding blow nozzles 22, preforms 12, and molds 14.

Figure 5:
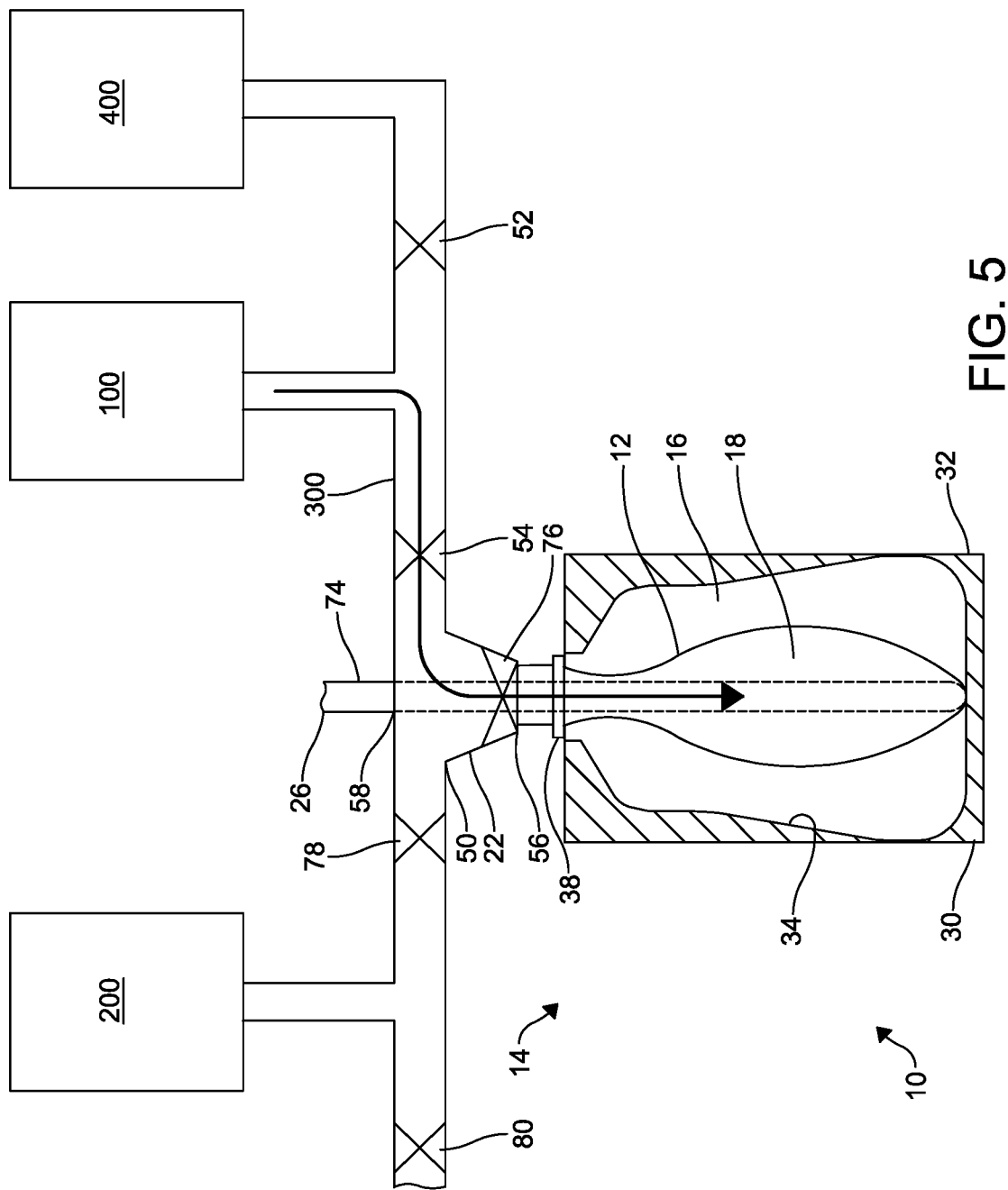
FIG. 5 is a schematic depiction of the system of FIG. 4, where the charge of liquid product is being dispensed from the dispensing unit into the stretched preform to partially expand the stretched preform to form a partially expanded preform.

With specific reference to FIG. 5, the dispensing means 100, 200 can then begin to dispense a charge of the liquid product, where the charge passes through conduit 300 and is transferred through the blow nozzle 22 and into the preform 12. Dispensing the charge of the liquid product into the preform 12 follows the path of the arrow shown in FIG. 5 for a one-part dispensing means 100. Where a multi-part dispensing means 100, 200 is employed, the charge of the liquid product can pass from reference numeral 100 through conduit 300 to reference numeral 200, where the charge of liquid product is then passed back through conduit 300 and into the blow nozzle for transfer into the preform 12. Valves 54, 76, 78 can be used to control the movement of the charge of liquid product from the respective one-part or multi-part dispensing means 100, 200 and the blow nozzle 22 to ultimately the preform 12.

In the example shown by the arrow shown in FIG. 5, valves 54, 76 (if present) can be positioned in an open state in providing the liquid product from dispensing means 100 to the blow nozzle 22. In this way, the liquid product is transferred through the conduit 300 to the blow nozzle 22 and through valve 76 into the stretched preform 12 to partially expand the stretched preform 12 toward the internal surface 34 of the mold cavity 16 to form a partially expanded preform 12. As the liquid product causes the stretched preform 12 to partially expand toward the interior surface 34 of the mold cavity 16, any residual air within the preform 12 can be vented through a passage 74 defined in the stretch rod 26. The dispensing means 100, 200 can be configured to provide the liquid product within a time period and at a pressure to simultaneously form and fill the container C with the product.

Figure 6:
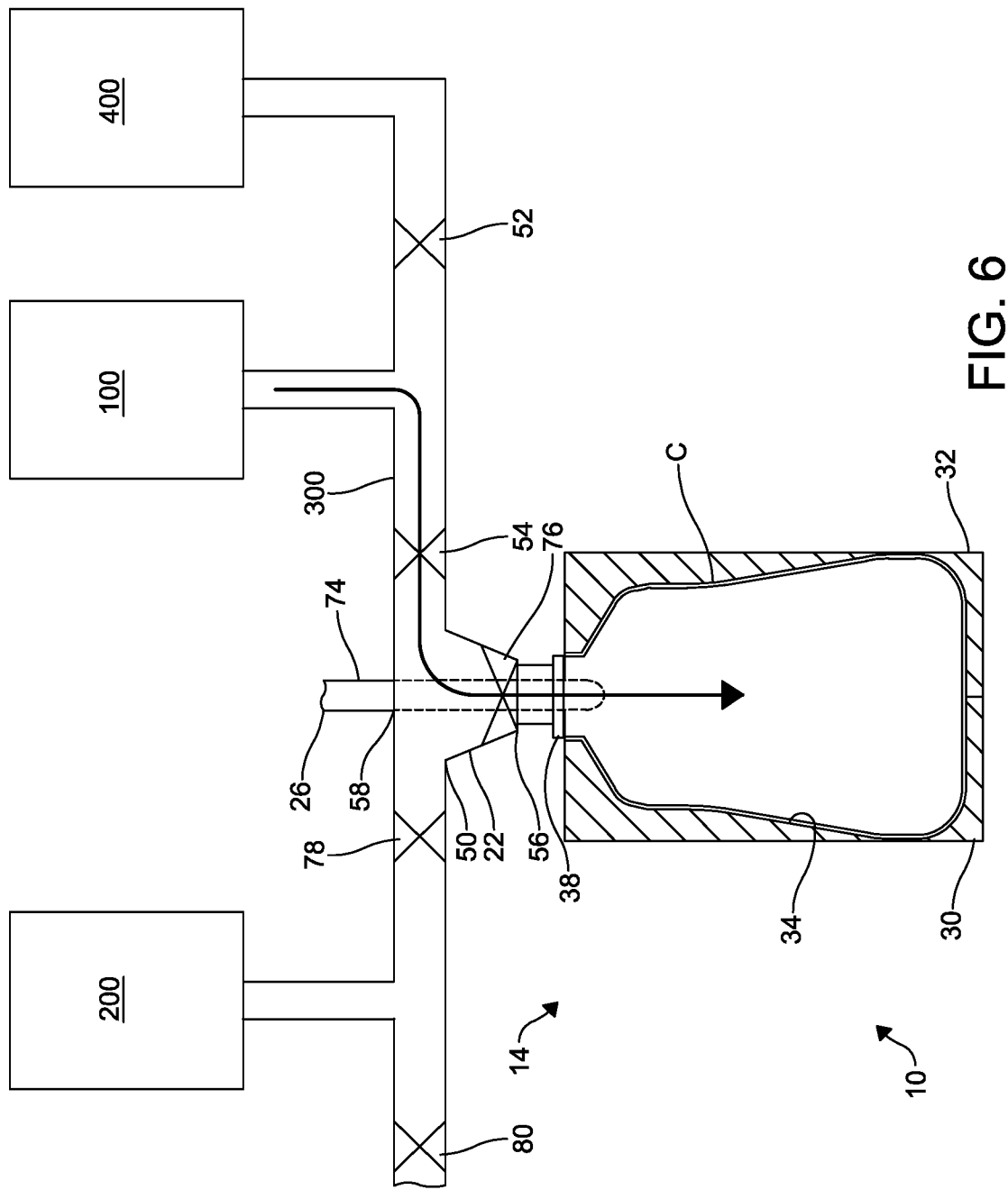
FIG. 6 is a schematic depiction of the system of FIG. 5, where a remainder of the charge of liquid product is being dispensed from the dispensing unit and transferred by the blow nozzle into the partially expanded preform to finish expansion and forming of the container within the mold, where the stretch rod is being withdrawn.

The charge of liquid product is shown dispensed from the dispensing means 100, 200 in FIG. 6, where the preform 12 is fully expanded to contact the internal surface 34 of the mold 14 to form the resultant container C, where the liquid product remains within the container C as an end product. Complete dispensing of the charge of the liquid product in the illustrated example follows the path of the arrow shown in FIG. 6. However, as noted herein, the charge of liquid product can be passed from a first part 100 (e.g., pressure source) of the dispensing means to a second part 200 (e.g., hydraulic intensifier) of the dispensing means through the conduit 300 and then onto to the blow nozzle 22. As the liquid product causes the partially expanded preform 12 to further expand toward the interior surface 34 of the mold cavity 16, any residual air within the preform 12 can be further vented through the passage 74 defined in the stretch rod 26. The stretch rod 26 can be withdrawn from the container C at this point.

As described, the hydrophobic surface that contacts the liquid product when the system 10 simultaneously forms and fills the container C can form part of the dispensing means 100, 200, the blow nozzle 22, the conduit 300, and/or the stretch rod 26. In certain embodiments, the hydrophobic surface can be a surface providing continuous contact with the liquid product from the point where the dispensing means 100, 200 forms the charge of the liquid product, the path of the charge of the liquid product through the conduit 300, through the blow nozzle 22 to where the charge of liquid product is transferred to the preform 12. In this way, any product residue can be minimized along an entire travel path the charge of liquid product takes from the dispensing means 100, 200 to the preform 12. Where the system 10 includes the reservoir 400, the dispensing means (e.g., one-part 100 or multi-part 100, 200) is configured to receive the liquid product from the reservoir 400. The hydrophobic surface can accordingly be in contact with the liquid product as the liquid product moves through the reservoir 400, the dispensing means (e.g., one-part 100 or multi-part 100, 200), the blow nozzle 22, the conduit 300, and the stretch rod 26.

Figure 7:
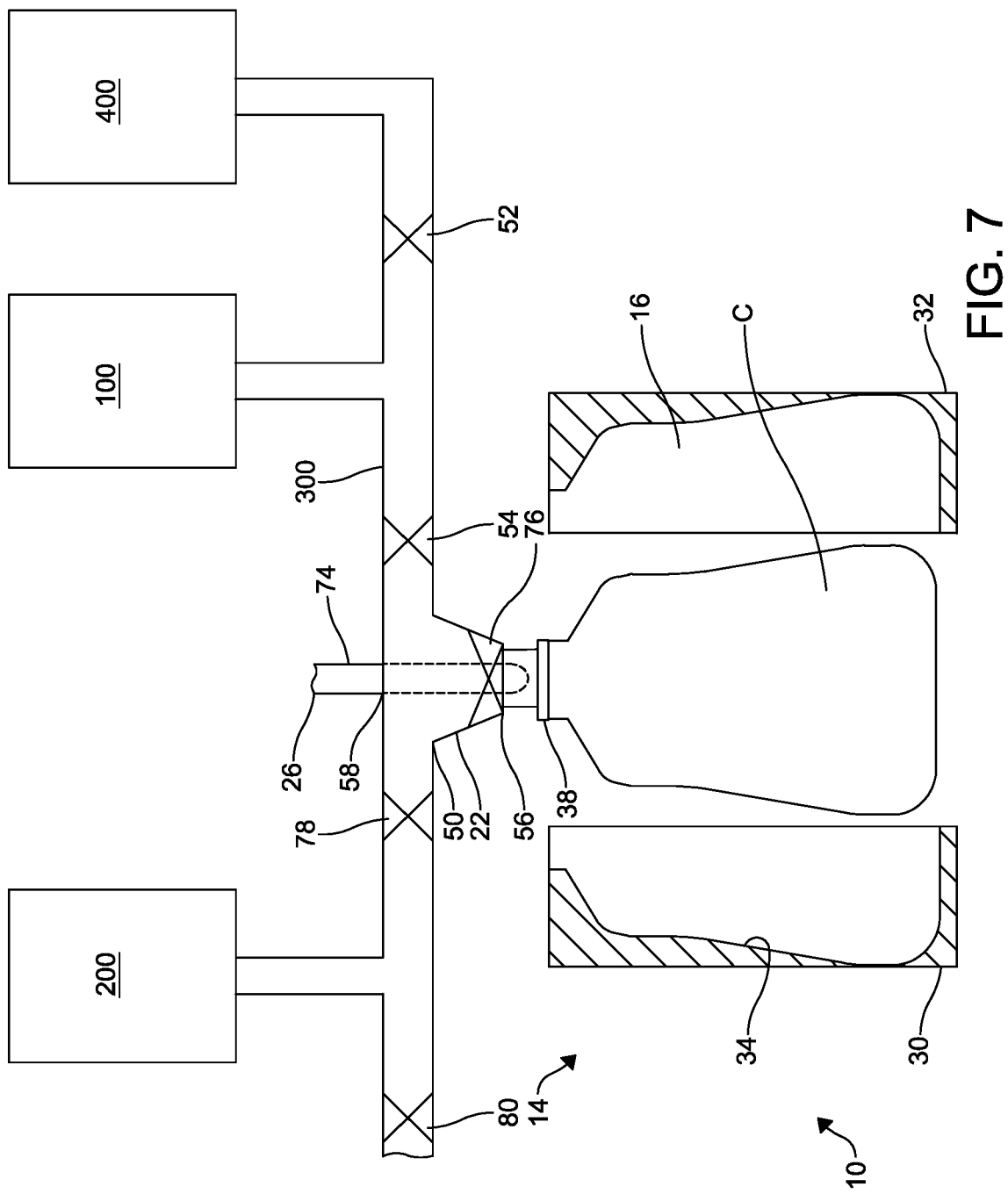
FIG. 7 is a schematic depiction of the system of FIG. 6, where the dispensing unit has completed the transfer of the charge of liquid product to the newly formed container, the stretch rod is withdrawn, and the mold halves separate to release the resultant container filled with the product.

As shown in FIG. 7, the dispensing means 100, 200 has completed the dispensing of the charge of liquid product, where transfer of the appropriate volume of the liquid product to the newly formed plastic container C is complete. Concomitant with or thereafter, the stretch rod 26 can be completely withdrawn from the formed and filled container C within the mold cavity 16 while continuing to vent any residual air through passage 74. In certain embodiments, the stretch rod 26 can be designed to displace a predetermined volume of the product when it is withdrawn from the mold cavity 16 thereby allowing for a desired fill level of the product within the resultant plastic container C. Generally, the desired fill level can correspond to a level at or near the level of the support ring 38 of the plastic container C. Where a surface of the stretch rod 26 includes the hydrophobic surface, the hydrophobic surface can minimize any residual product sticking or adhering to the stretch rod 26 as it is withdrawn from the formed and filled container C.

At this point, the form and fill cycle is complete. The mold halves 30, 32 can separate, the blow nozzle 22 can be withdrawn, and the product filled container C removed from the mold 14. The formed and filled container C can now be subjected to various post-forming steps as desired, including various capping, labeling, and packing operations. The dispensing means 100, 200 can begin another cycle in preparing another charge of liquid product. Another preform 12 can be positioned within the mold 14. While not specifically shown, it is appreciated that the system 10 can include a controller for communicating signals to one or more of the various components. In this way, the dispensing means 100, 200, the mold 14, the blow nozzle 22, the stretch rod 26, and various valves can operate according to one or more signals communicated by the controller. It is also contemplated that the controller can be utilized to adjust various parameters associated with these components according to a given application.

Figure 8A:
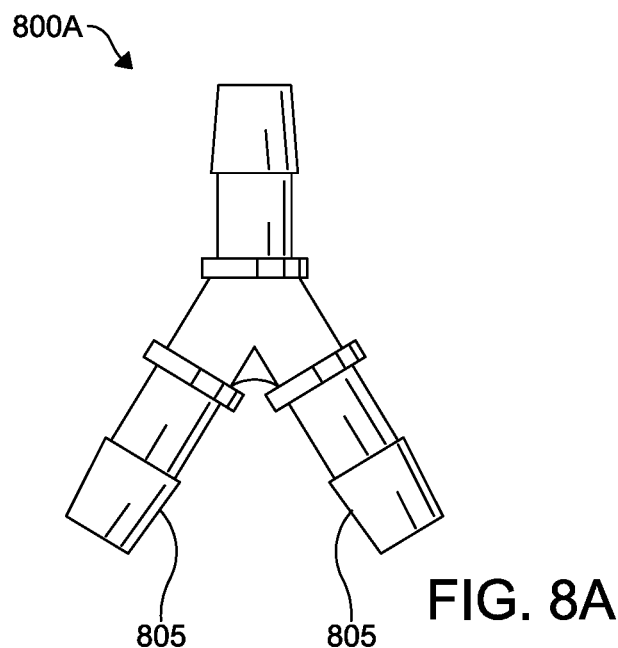
FIGS. 8A-8B are schematic depictions of embodiments of manifolds that can couple a dispensing unit to multiple blow nozzles and associated molds.
Figure 8B:
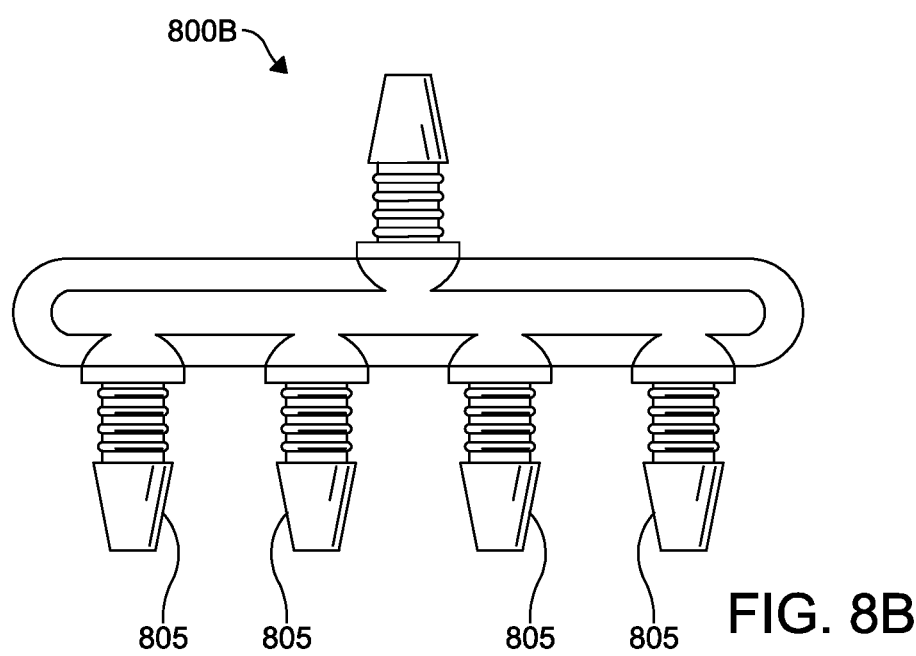

FIGS. 8A-8B are schematic depictions of embodiments of manifolds 800A, 800B that can be incorporated into conduit 300 used to fluidly couple the dispensing means 100, 200 to multiple blow nozzles 22. In particular, the conduit 300 can incorporate one of the embodiments of manifolds 800A, 800B, each having multiple branches 805 fluidly coupled to multiple blow nozzles 22 and molds 14. Each branch 805 of the manifold 800A, 800B can include a valve (not shown) that can allow the liquid product to be selectively directed to certain branches 805 or all the branches 805. FIG. 8A shows a bifurcated manifold that can be used to split the charge of the liquid product from the dispensing means 100, 200 into two blow nozzles 22, each blow nozzle 22 coupled to a respective preform 12 and mold 14. FIG. 8B shows a quadfurcated manifold that can be used to split the charge of the liquid product from the dispensing means 100, 20 into four blow nozzles 22, each blow nozzle 22 coupled to a respective preform 12 and mold 14. As part of the conduit 300, such manifolds can include one or more hydrophobic surfaces that contact the liquid product when the system 10 simultaneously forms and fills the container C.

Methods of cleaning systems for simultaneously forming and filling containers with a liquid product are provided. Such systems include the various systems described herein and shown in the figures. In particular, methods of cleaning include where a gas is blown across the hydrophobic surface that contacts the liquid product when the system simultaneously forms and fills the container to remove residual liquid from the hydrophobic surface. The residual liquid can include residual product from a prior forming and filing operation and/or a cleaning solution used to flush and clean the system. The gas can also be a dry gas or low humidity gas (e.g., bone dry carbon dioxide, dry nitrogen) to aid in removal and evaporation of residual liquid. The gas can be blown through the path the liquid product travel to form and fill the resultant container. The gas can also be blown through the system and subparts of the system in various directions. For example, where the hydrophobic surface is part of the dispensing means, the blow nozzle, the conduit, the stretch rod, and/or the reservoir, various valves can be opened and gas blown therethrough. Further examples include where gas is introduced through valve 80 while valves 78 and 76 are open, where gas is introduced through dispensing means 100, dispensing means 200, and/or reservoir 400 while valves 52, 54, 76, 78, 80 are opened. Various portions of the system have gas blown therethrough in succession, as well. Examples include where gas is blown through dispensing means 100 with valves 54 and 76 open, where gas is blown through dispensing means 200 with valve 80 open or with valves 78 and 76 open, where gas is blown through reservoir 400 with valves 52, 54, 76 open, including various orders of performing such steps. Contamination is accordingly reduced, stagnation or drying of residual liquids within the system is reduced, and the need to disassemble portions of the system for effective cleaning thereof are reduced.

The methods of cleaning systems for simultaneously forming and filling containers with a liquid product accordingly minimize contamination between different liquid products, including where the system includes more than one reservoir for more than one type of liquid product. Cleaning can be performed prior to shutdown or storage of the system to minimize residual liquid product in the system. Cleaning can also be performed between successive dispensing operations of different liquid products.

While the present disclosure contemplates the production of PET containers, it is understood that other polyolefin materials (e.g., polyethylene, polypropylene, polyester, etc.) as well as a number of other plastics can be processed using the present technology.

The following benefits and advantages can be realized by the present technology. The present systems and ways of using such systems can form and fill a container with liquid products exhibiting low surface tension, high viscosity, and/or that have an affinity or even reactivity with certain surfaces. Reduction to substantial elimination of residual product or a cleaning solution is possible. Minimizing any sticking, adhering, or reacting of liquid product to parts of surfaces to which the liquid product contacts can significantly improve the handling and transferring of such products in simultaneously forming and filling containers. The ability to transfer an accurate defined charge or quantity of product through the system facilitates optimization of the process. For example, a preform can be designed to expand by a defined amount within a defined mold volume, where a more accurate defined charge of liquid product can now be applied to form and fill the preform into a resultant container. Additional benefits and advantages relate to improved cleaning of the system, as the hydrophobic liquid transfer surfaces facilitate removal of any residual liquid product or a cleaning solution, where residual liquid can bead up and have minimal contact with the hydrophobic liquid transfer surface(s) and more easily be blown out of the system by a pressurized gas.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for simultaneously forming and filling a container with a liquid product, the system comprising:
    a mold cavity defining an internal surface and configured to accept a preform;
    a dispensing means configured to receive the liquid product and dispense a charge of the liquid product;
    a blow nozzle configured to transfer the charge of the liquid product dispensed from the dispensing means into the preform to urge the preform to expand toward the internal surface of the mold cavity and form a resultant container, where the liquid product remains within the container as an end product;
    a conduit fluidly coupling the dispensing means to the blow nozzle; and
    a hydrophobic surface formed along a flow path extending from the dispensing means to the outlet of the blow nozzle, wherein the hydrophobic surface forms at least part of each of the dispensing means, the conduit, and the blow nozzle.

2. The system of claim 1, further comprising a stretch rod configured to mechanically stretch the preform within the mold cavity prior to the charge of the liquid product being transferred into the preform by the blow nozzle, and wherein the stretch rod further includes the formation of the hydrophobic surface thereon.

3. The system of claim 1, wherein the hydrophobic surface is formed continuously along the flow path such that the liquid product is in continuous contact with the hydrophobic surface when flowing along the flow path between the dispensing means and the outlet of the blow nozzle.

4. The system of claim 2, wherein the stretch rod is vented.

5. The system of claim 1, wherein the dispensing means includes a pressure source, and wherein the pressure source has an inlet, a chamber, an outlet, and a mechanically driven piston-like device moveable within the chamber in a first direction to draw liquid product into the chamber through the inlet and moveable in a second direction to urge the liquid product out of the chamber through the outlet as the charge of the liquid product, and wherein the piston-like device is one of a piston, a pump, and an accumulator.

6. The system of claim 1, wherein the dispensing means includes a servo system.

7. The system of claim 1, wherein the dispensing means includes a pressure source and a hydraulic intensifier.

8. The system of claim 1, wherein the dispensing means includes a two-stage injection unit.

9. The system of claim 1, wherein the flow path further extends to a reservoir including the liquid product, wherein the dispensing means is configured to receive the liquid product from the reservoir when the liquid product flows along the flow path, and wherein the hydrophobic surface further forms part of the reservoir.

10. The system of claim 1, wherein the hydrophobic surface includes a hydrophobic coating.

11. The system of claim 10, wherein the hydrophobic coating includes a polymeric coating, the polymeric coating including a member selected from a group consisting of polyethylene, polystyrene, polyvinylchloride, polytetrafluorethylene, polydimethylsiloxane, and combinations thereof.

12. The system of claim 1, wherein the hydrophobic surface includes a hydrophobic microstructure.

13. The system of claim 1, wherein the hydrophobic surface includes a hydrophobic coating having a hydrophobic microstructure.

14. The system of claim 1, wherein the hydrophobic surface is formed by a surface treatment.

15. The system of claim 14, wherein the surface treatment includes one of a plasma treatment and an anodizing treatment.

16. The system of claim 1, further comprising a source of pressurized gas fluidly coupled to the flow path at a position upstream of the outlet of the blow nozzle with respect to a flow of the liquid product flowing through the flow path towards the outlet of the blow nozzle, wherein the pressurized gas is configured to remove residual liquid from the hydrophobic surface formed along the flow path.

17. The system of claim 16, wherein the residual liquid comprises at least one of the liquid product or a cleaning solution.

18. The system of claim 16, wherein the pressurized gas is a dry gas or low humidity gas to aid in evaporation of the residual liquid.

19. The system of claim 16, wherein the source of pressurized gas is fluidly coupled to the flow path via one of a valve provided at an inlet into the blow nozzle disposed upstream of the outlet thereof with respect to the flow of the liquid product through the blow nozzle, the dispensing means, or a fluid reservoir storing the liquid product prior to reception of the liquid product within the dispensing means.

20. The system of claim 19, wherein when the source of pressurized gas is fluidly coupled to the flow path via the valve provided at the inlet into the blow nozzle the pressurized gas exits the flow path via at least one of the outlet of the blow nozzle, the dispensing means, or the fluid reservoir, wherein when the source of pressurized gas is fluidly coupled to the flow path via the dispensing means the pressurized gas exits the flow path via at least one of the outlet of the blow nozzle or the valve provided at the inlet into the blow nozzle, and wherein when the source of pressurized gas is fluidly coupled to the flow path via the fluid reservoir the pressurized gas exits the flow path via the outlet of the blow nozzle.

* * * * *